Oct. 27, 1953                M. J. CAPARONE                2,656,984
            THERMOSTATIC CONTROL DEVICE FOR WATER HEATERS
Filed Sept. 22, 1950                                2 Sheets-Sheet 1

INVENTOR
Michael J. Caparone.
BY
Albert J. Henderson
HIS ATTORNEY

INVENTOR
Michael J. Caparone.
BY
HIS ATTORNEY

Patented Oct. 27, 1953

2,656,984

UNITED STATES PATENT OFFICE 2,656,984

THERMOSTATIC CONTROL DEVICE FOR WATER HEATERS

Michael J. Caparone, Arcadia, Calif., assignor to Robertshaw-Fulton Controls Company, Greensburg, Pa., a corporation of Delaware Application September 22, 1950, Serial No. 186,159

11 Claims. (Cl. 236—102)

This invention relates to controls for gaseous fuel burners and more particularly to thermostatic controls therefor. A principal object of this invention is the provision of new and improved apparatus of this type.

The present invention is particularly adapted, although not limited, for use with gas burning water heaters and the like wherein water temperatures are to be controlled within precise limits. It is well known that demands upon water heaters vary and in any installation the size of water heater needed will be determined by the peak demand on the system. Since peak demands such as occur on wash days occur only at intervals, a heater large enough to supply such demands will be uneconomical during normal use. Abnormal demands upon a water heating system are not necessarily restricted to requirements for increased amounts of water at normal temperature but may also call for an interim supply of water at a temperature higher than normal as for example would be needed in the rinsing operation of a domestic dishwasher. It will therefore be apparent that it would be advantageous to provide a control for a water heater which could be set to provide a single tank full of hot water at a temperature higher than that normally maintained. It is an object of this invention to provide such a control.

It is a further object of this invention to provide a thermostatic control which will provide for a transitory supply of high temperature heated medium with automatic return to normal temperature control.

This invention provides a fluid fuel control wherein the flow of fuel is under the control of a valve which in turn is controlled by a mechanism responsive to the temperature of the medium to be heated. Means is provided for setting the temperatures at which the valve will be actuated and includes two adjusting means, one of which is operative until the temporary high temperature of the medium to be heated is attained, after which it becomes inoperative and the other adjusting means becomes operative to set the temperature for normal operation.

In the preferred embodiment of the invention, the adjusting means take the form of a novel lever device comprising a lever arm interposed between the control valve and a temperature responsive element in such a manner that location of its fulcrum will determine the temperature at which the control valve will be actuated, and a pair of fulcrums alternatively cooperable with the lever arm. During normal operation, the lever arm engages the first fulcrum which may be adjustable over a range of positions to provide a range of temperature settings. To provide for the transitory high temperature setting, the lever arm is movable out of engagement with the first fulcrum and into engagement with the second fulcrum which latter engagement may be terminated through the operation of the mechanism responsive to the temperature of the medium to be heated.

Other objects and advantages will become apparent from the following description taken in connection with the accompanying drawings wherein.

Main shut-off cock

Figure 1:
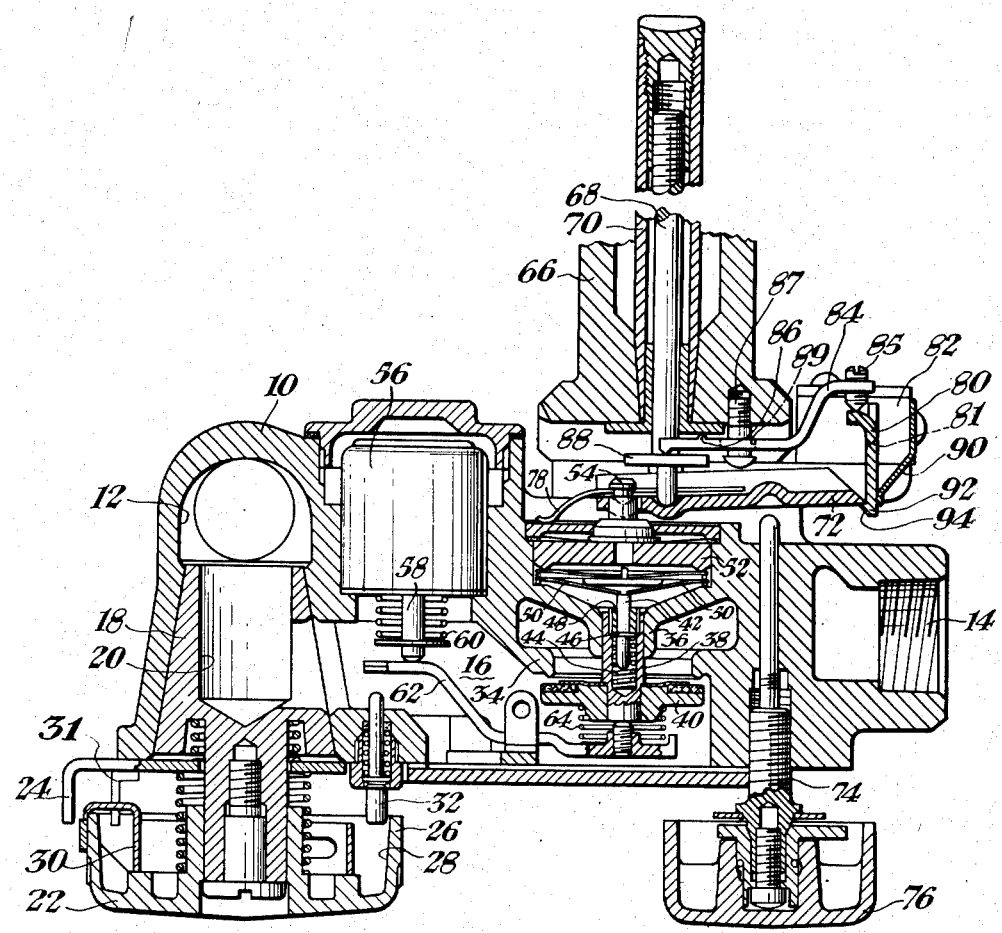
Fig. 1 is a longitudinal sectional view of a control device embodying this invention.

Referring more particularly to Fig. 1 of the drawings, the control device comprises a casing 10 provided at one end with a lateral inlet opening 12 and at the other end with an outlet opening 14 for the fuel. A main fuel passage 16 through the casing 10 provides communication between the inlet 12 and the outlet 14. As is customary in such devices, suitable pipe connections may be provided at the inlet 12 and the outlet 14 to convey fuel through the passage 16 to a main burner (not shown) of the appliance upon which the control is to be used.

The passage of fuel between the inlet 12 and the outlet 14 is here shown as being under the control of a main shut-off cock 18. The cock 18 is provided with an angular port 20 which is movable upon manual rotation of the cock 18 to open and close communication through the passage 16 between the inlet 12 and the outlet 14. A handle or knob 22 is secured to the projecting end of the cock 18 and carries the usual indicia for the open and closed positions, the indicia being arranged to register selectively with a pointer 24 secured to the casing 10 in an appropriate location.

Suitable means may be employed for limiting the rotation of the cock 18 to approximately 180 degrees between the full-open and the full-closed positions. Thus, the knob 22 may be recessed on its underside to define an annular rim portion 26 containing an arcuate recess 28. An end wall of the recess 28 and a stop 30 alternately engage the sides of a plate 31 suitably secured to the pointer 24 to project into the recess 28 and serve as a limit stop for the purpose described.

A plunger 32 projects from the casing 10 into the recess 28. A knob 22 is adapted for axial movement relative to the cock 18 and is provided on its underside with an unrecessed or land portion (not shown) which is adapted to engage the plunger 32 upon axial movement of the knob 22 when the cock 18 is in a position wherein the land portion and the plunger 32 are aligned.

Control valve mechanism

An annular valve seat member 34 is formed in the casing 10 in position to intersect the passage of fuel from the inlet 12 to the outlet 14 through the valve chamber 16. An axial hollow boss 36 is formed within the annular valve seat 34 and provides a bearing for a hollow valve stem 38 for relative slidable movement thereof. A disc valve member 40 is mounted on the valve stem 38 for movement therewith between open and closed positions relative to the valve seat 34. The valve member 40 is normally biased toward the valve seat 34 by means to be more fully described.

The hollow valve stem 38 contains an override mechanism comprising a plunger 42 and biasing spring 44 which serves to urge a collar 46 on the plunger 42 into engagement with a bushing 48 closing the inner end of the hollow valve stem 38. The plunger 42 projects through the bushing 48 for operative engagement with the amplifying levers 50 of a clicker mechanism of well known form including a thrust element 52 which serves to impart snap-action movement to the valve member 40. The thrust element 52 carries valve operating means here shown as a thrust button 54 which projects from the casing 10 for operation by a thermally responsive mechanism as will more fully appear.

Automatic shut-off control

Thermoelectric means is provided for moving the valve member 40 to closed position upon the occurrence of certain conditions as for example, failure of the pilot flame.

To this end, the casing 10, intermediate the main shut-off cock 18 and the control valve 40, is recessed for the reception of a magnet housing 56. An electromagnet and associated armature (not shown) are disposed within the housing 56 and an armature stem 58 therefor projects to the exterior of the magnet housing 56 into the passage 16. The armature stem 58 is biased to its released position relative to the magnet by a coil spring 60 which is operative between the armature stem 58 and the magnet housing 56. Electric current for energizing the magnet may be generated by a thermocouple (not shown) responsive to heating thereof in a manner well known in the art.

In thermoelectric devices of the type here shown, the electrical energy generated by the thermocouple responsive to heating thereof will be insufficient to attract the armature and armature stem 58 from released position but will be sufficient to hold the same in attracted position after the usual resetting operation has been conducted. Consequently, manual resetting means including the plunger 32, previously described, is employed to conduct the resetting operation. To this end, a lever device 62 is pivoted intermediate its ends in the passage 16 and has one end positioned between the armature stem 58 and the plunger 32. The opposite end of the lever device 62 overlies the valve member 40 and a coil spring 64 extends between these members. Thus, the lever device 62 is normally biased into engagement with the armature stem 58 but insufficiently to overcome the bias of the armature stem spring 60 unless the plunger 32 is manually operated to its depressed position.

Temperature regulation

Thermally responsive means for operating the valve member 40 through the clicker mechanism 50—54 is carried by a thermostat housing 66 which is secured to the exterior of the casing 10 in any suitable manner. The housing 66 may be of conventional form for securing the control casing 10 to the tank of a water heater. The usual rod-and-tube elements 68, 70 project from the housing 66 into the tank of the water heater and, as is customary in such devices, the rod 68 has a relatively low coefficient of expansion while the tube 70 has a higher coefficient of expansion. The differential under the influence of the heat of the water in the tank causes the rod element 68 to move outwardly of the casing 10.

The rod element 68 projects into the casing 10 on one side of the thrust button 54 and engages connecting means here shown as a connecting lever 72 having an operating end supported on the thrust button 54. The opposite end of the lever 72 is engageable by an adjusting screw 74 which extends through the casing 10 on an axis substantially parallel with that of the valve member 40. An adjusting knob 76 is carried on the adjusting screw 74 for selectively setting the temperature to be maintained by the rod and tube element 68, 70. Yieldable means in the form of a leaf spring 78 is carried by the thrust button 54 for operative engagement with the lever 72 to maintain the lever 72 in engagement with the thrust button 54 and to bias the lever 72 toward the adjusting screw 74.

A bell-crank lever 80 is pivotally mounted on knife edges 81 immediately above the free end of the lever 72 in an extension 82 of the thermostat housing 66 and is arranged to be engaged by one end of a lever 84 having its fulcrum 86 engageable with the thermostat housing 66. The lever 84 may carry a screw 85 in its one end to provide an adjustable connection with the bell-crank lever 80. The other end of the lever 84 engages a collar 88 secured to the rod 68 of the thermostat for movement therewith. The medial portion of the lever 84 is provided with a slot 89 which slidingly receives a positioning screw 87 threaded into the thermostat housing 66, sufficient clearance being provided between the screw 87 and the edges of the slot 89 to permit limited pivotal movement of the lever 84 about its fulcrum 86. The bell-crank lever 80 is biased into engagement with the lever 84 by a leaf spring 90 secured to the extension 82 of the thermostat housing 66 in any suitable manner.

Figure 4:
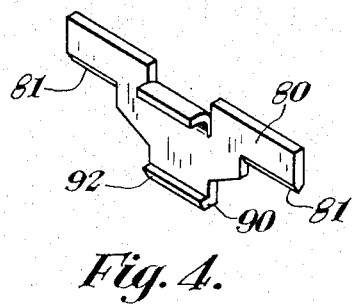
Fig. 4 is a perspective view of a detail.
Figure 2:
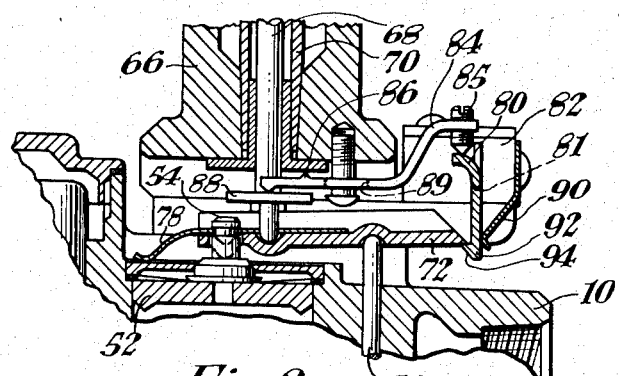
Fig. 2 is a fragmentary sectional view of the device shown in Fig. 1 with the parts thereof in another position.

The end of the bell-crank lever 80, opposite the end thereof engaged by the lever 84, is provided with a laterally extending lug 92 having its end surface 94 forming a bevel with the bottom surface thereof. As best shown in Figs. 1 and 2, the bell-crank lever 80 and the lug 92 form a detent or latch for holding the connecting lever 72 in a given position as will more fully appear. Fig. 4 shows a preferred form of the bell-crank lever 80, however, it will be apparent that other forms thereof may well occur to persons skilled in the art.

Figure 3:
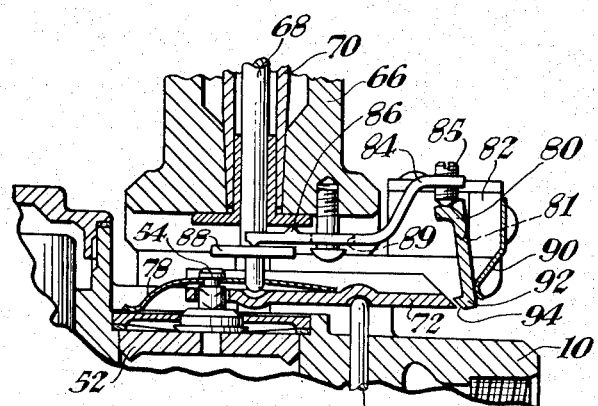
Fig. 3 is a fragmentary sectional view of the device shown in Fig. 1 with the parts thereof in still another position.

In normal operation, the adjusting screw 74 is in engagement with the lever 72 to provide a fulcrum therefor. It will be apparent that manipulation of the adjusting screw 74 to move same axially will move the fulcrum of the lever 72 to thereby vary the distance through which the rod 68 must move to cause actuation of the valve member 40. Thus, the position of the fulcrum of the lever 72 will determine the temperature at which the valve member 40 will be actuated. The threaded portion of the adjusting screw 74 is of sufficient length to permit the adjusting screw to move the lever 72 from the position shown in Fig. 3 to the position shown in Fig. 2, where it may be engaged by the lug 92 on the bell-crank lever 80 to be retained in such position when the adjusting screw is backed off to the position shown in Fig. 1.

Figure 5:
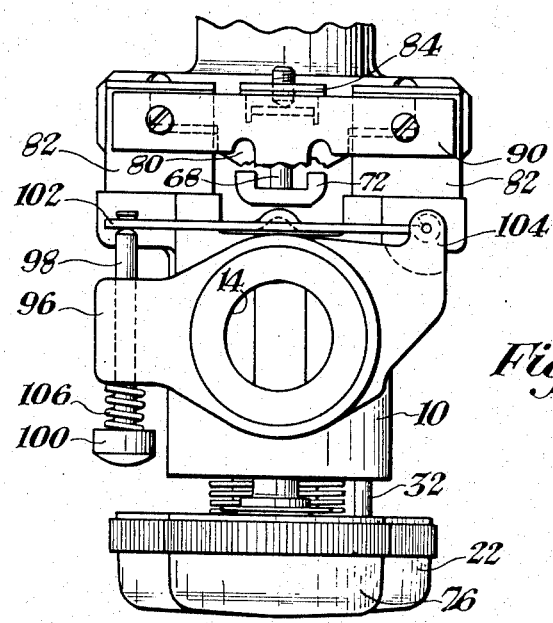
Fig. 5 is an end view of a second embodiment of this invention with a portion thereof broken away.

Referring now to Fig. 5, the modified construction illustrated therein, in which like numerals designate corresponding parts, is a departure from that shown in Figs. 1 through 4 in that a different means is employed to move the lever 72 into engagement with the bell-crank lever 80. In the embodiment shown in Fig. 5, the casing 10 is provided with a laterally extending lug 96 in which is slidably carried a push rod 98 having its axis disposed substantially parallel to the axis of the valve member 40. One end of the push rod 98 carries a push button 100 and the other end thereof is connected to one end of a lever 102. The other end of the lever 102 is pivotally mounted in a suitable bracket 104 formed on the casing 10 and so disposed that the lever 102 extends transversely of the casing 10 and underlies the lever 72.

The lever 102 is biased away from the lever 72 by a coil spring 106 operative between the push button 100 and the lug 96 formed on the casing 10. It will be apparent that manual operation of the push rod 98 against the bias of the spring 106 will move the lever 102 into engagement with the lever 72 and move the lever 72 into engagement with the lug 92 of the bell-crank lever 80.

*Operation*

It may be assumed that the control device is in its normal operating condition with the main cock 18 in its open position and the armature stem 56 in its retracted position as shown in Fig. 1. As hereinbefore pointed out, in normal operation the adjusting screw 74 of the control device is in engagement with the lever 72 to provide a fulcrum therefor and the setting of the adjusting screw will determine the temperature of the water in the heater tank. If it is desired to provide a single tank full of water at a temperature above the normal temperature maintained, the adjusting screw 74 is manipulated to move it axially inward (as shown in Fig. 2) through a distance sufficient to position the lever 72 in engagement with the lug 92 of the bell-crank lever 80.

As the end of the lever 72 moves upward, it will engage the surface 94 of the lug 92 to cause movement of the bell-crank lever 80 in a counterclockwise direction about its knife edges 81 and against the bias of the leaf spring 90. Further upward movement of the end of the lever 72 will move the end of the lever 72 out of engagement with the surface 94 of the lug 92. The bell-crank lever 80, acting under the bias of the leaf spring 90, will move in a clockwise direction about its knife edges 81 to position the lug 92 beneath the end of the lever 72. Thus, the bell-crank lever 80 and the lug 92 comprise a latch for retaining the lever 72 in a predetermined position whereby the adjusting screw 74 may be backed off to its normal position leaving the various parts of the control device in the positions shown in Fig. 1. When the lever 72 is in the position shown in Fig. 1, the lug 92 will form a fulcrum therefor to set a definite distance through which the rod 68 must move to release the pressure on the thrust button 54 and permit movement of the valve member 40 under its bias to its closed position thus setting a definite temperature at which the valve member 40 will be actuated. It will be apparent that the valve member 40 will remain in the open position to permit fuel to flow to the burner until the water in the heater tank reaches this definite temperature.

When the temperature of the water in the heater tank reaches the value corresponding to the setting of the lever 72 the rod 68 will have been moved upwardly by the expanding tube 70 to reduce the force exerted thereby on the clicker mechanisms 50—54 through the lever 72 sufficiently to permit the valve 40 to move to its closed position and the collar 89 carried by the rod 68 will have been moved upwardly through a sufficient distance to move the lever 84 upwardly relative to the positioning screw 87 to bring the fulcrum 86 of the lever 84 into engagement with the thermostat housing 66. A slight further increase in the temperature of the water in the tank will cause pivotal movement of the lever 84 about its fulcrum 86 in a clockwise direction. Such movement of the lever 84 will be transmitted to the bell-crank lever 80 through the adjusting screw 85 to cause counterclockwise movement of the bell-crank lever 80 about its knife edges 81 to release the end of the lever 72 and permit it to move under the bias of the leaf spring 78 in a clockwise direction about the thrust button 54 and into engagement with the adjusting screw 74 to the position shown in Fig. 3. The control device will then continue to regulate the temperature of the water in the heater tank in accordance with the setting of the adjusting screw 74 unless the lever 72 is again manually operated to be moved into latching engagement with the lug 92.

It will be apparent that the adjusting screw 85 may be manipulated to govern the temperature at which the lug 92 will be disengaged from the lever 72. This temperature may be set at a value below the value corresponding to the setting of the lever 72 when same is engaged by the lug 92 and when so set, release of the lever 72 from the lug 92 will effect closing of the valve 40.

Operation of the embodiment shown in Fig. 5 is similar to the operation previously described and differs only in that movement of the lever 72 into latching engagement with the lug 92 is effected by the push rod 98 and lever 102. With such an arrangement the normal temperature setting of the adjusting screw 74 need not be disturbed.

It will be apparent from the foregoing that the illustrated embodiments of the invention provide new and improved thermostatic controls and accordingly accomplish the objects of the invention. On the other hand, it will be obvious to those skilled in the art that the illustrated embodiments may be variously changed and modified, or features thereof, singly or collectively, embodied in other combinations than those illustrated without departing from the spirit of the invention or sacrificing all of the advantages thereof, and that accordingly the disclosures herein are illustrative only and the invention is not limited thereto.

It is claimed and desired to secure by Letters Patent:

1. In a temperature control device, a casing having a passage for fluid therethrough, valve means for controlling the flow of fluid through said passage, thermally responsive operating means for said valve means, means for adjusting said operating means to actuate said valve means in response to a first selected temperature condition, means for setting said operating means to actuate said valve means in response to a second temperature condition, and means cooperable with said operating means in response to said second selected temperature condition for rendering said setting means inactive.

2. In a temperature control device, a casing having a passage for fluid therethrough, valve means for controlling the flow of fluid through said passage, thermally responsive operating means for said valve means, means for setting said operating means to respond to a selected temperature condition, means responsive to said selected temperature condition for positioning said setting means in an inoperative position, and means for adjusting said operating means to respond to a second selected temperature condition while said setting means is in its inoperative position.

3. A fluid control mechanism comprising a casing having a passage for fluid therethrough, valve means movable between controlling positions for controlling the flow of fluid through said passage, thermally responsive operating means for said valve means, adjusting means cooperable with said operating means for adjusting said operating means to actuate said valve means in response to a first temperature condition, setting means cooperable with said operating means for setting said operating means to actuate said valve means in response to a second temperature condition, means for establishing an operative relation between said setting means and said operating means, and means for terminating said operative relation between said setting means and said operating means and establishing an operative relation between said adjusting means and said operating means in response to said second temperature condition.

4. A fluid control mechanism comprising a casing having a passage for fluid therethrough, valve means movable between controlling positions for controlling the flow of fluid through said passage, thermally responsive operating means, connecting means between said operating means and said valve means, adjusting means cooperable with said connecting means for selectively setting a temperature condition to which said operating means will respond to effect movement of said valve means between said controlling positions, setting means cooperable with said connecting means for setting a second temperature condition to which said operating means will respond, means for establishing an operative relation between said setting means and said connecting means, and means for terminating said operative relation and establishing an operative relation between said adjusting means and said connecting means in response to said second temperature condition.

5. A fluid control mechanism comprising a casing having a passage for fluid therethrough, valve means movable between controlling positions for controlling the flow of fluid through said passage, thermally responsive means, connecting means between said thermally responsive means and said valve means for transmitting movement therebetween, said connecting means being adjustable to set the temperatures at which said valve means will be moved between said controlling positions, adjusting means operatively engageable with said connecting means for selectively setting the latter through a range of positions, means for moving said connecting means to a predetermined position out of engagement with said adjusting means, and detent means for retaining said connecting means in said last named position.

6. A fluid control mechanism comprising a casing having a passage for fluid therethrough, valve means movable between controlling positions for controlling the flow of fluid through said passage, thermally responsive means, connecting means between said thermally responsive means and said valve means for transmitting movement therebetween, said connecting means being adjustable to set the temperatures at which said valve means will be moved between said controlling positions, adjusting means operatively engageable with said connecting means for selectively setting the latter through a range of positions, means for moving said connecting means to a predetermined position out of engagement with said adjusting means, detent means for retaining said connecting means in said last named position, and means cooperable with said thermally responsive means for releasing said detent means.

7. A fluid control mechanism comprising a casing having a passage for fluid therethrough, valve means movable between controlling positions for controlling the flow of fluid through passage, thermally responsive means, a lever device between said thermally responsive means and said valve means for transmitting movement therebetween, said lever device being movable for adjusting the temperature at which said valve means will be actuated, adjusting means operatively engageable with said lever device for selectively setting said lever device over a range of positions, and means for terminating operative engagement between said adjusting means and said lever device and positioning the latter in a predetermined position.

8. A fluid control mechanism comprising a casing having a passage for fluid therethrough, valve means movable between controlling positions for controlling the flow of fluid through said passage, thermally responsive means, a lever device between said thermally responsive means and said valve means for transmitting movement therebetween, said lever device being movable for adjusting the temperature at which said valve means will be actuated, adjusting means operatively engageable with said lever device for selectively setting said lever device over a range of positions, means for terminating operative engagement between said adjusting means and said lever device and positioning the latter in a predetermined position, and means cooperable with said thermally responsive means for releasing said lever device from said last named position and restoring operative engagement between said lever device and said adjusting means.

9. A fluid control mechanism comprising a casing having a passage for fluid therethrough, valve means movable between controlling positions for controlling the flow of fluid through said passage, thermally responsive means, a lever arm connected to said thermally responsive means and said valve means for transmitting movement therebetween, said lever arm being so constructed and arranged that the position of its fulcrum relative to said valve means will determine the temperature at which said valve means will be actuated, adjustable fulcrum means normally in operative engagement with said lever arm, second fulcrum means, means for moving said lever arm out of operative engagement with said adjustable fulcrum means and into operative engagement with said second fulcrum means, and means cooperable with said thermally responsive means for terminating the operative engagement between said lever arm and said second fulcrum means.

10. A fluid control mechanism comprising a casing having a passage for fluid therethrough, valve means for controlling the flow of fluid through said passage and being biased to the closed position, a lever arm operatively connected to said valve means, thermally responsive means operatively engageable with said lever arm, adjustable means normally providing a fulcrum for said lever arm, means for biasing said lever arm into engagement with said adjustable means, a latch, means for moving said lever arm out of engagement with said adjustable means and into engagement with said latch, said lever arm being adapted to fulcrum on said latch when engaged thereby, and means cooperable with said thermally responsive means for terminating the engagement between said latch and said lever arm.

11. In a temperature control device for use with heating apparatus, control means movable between positions for controlling the supply of operative energy to the heating apparatus, thermally responsive operating means for moving said control means between said positions, means including an adjustable element for setting the temperature at which said operating means will actuate said control means, means for holding said element in a first position to condition said operating means to respond to a first temperature condition, and means for moving said element to a second position to condition said operating means to respond to a second temperature condition when said first temperature condition is attained.

MICHAEL J. CAPARONE.

References Cited in the file of this patent

UNITED STATES PATENTS

| Number | Name | Date |
|---|---|---|
| 2,084,982 | Anderson | June 29, 1937 |
| 2,365,615 | Woodman | Dec. 19, 1944 |
| 2,379,398 | Clark | June 26, 1945 |
| 2,480,302 | Pankow | Aug. 30, 1949 |
| 2,521,277 | Aubert | Sept. 5, 1950 |
| 2,548,516 | Cantalupo | Apr. 10, 1951 |